United States Patent
Yamada et al.

(10) Patent No.: US 12,508,661 B2
(45) Date of Patent: Dec. 30, 2025

(54) DRILL

(71) Applicants: Sumitomo Electric Hardmetal Corp., Itami (JP); Toyota Jidosha Kabushiki Kaisha, Toyota (JP)

(72) Inventors: Masashi Yamada, Itami (JP); Naoyuki Wakatsuki, Toyota (JP); Yasumasa Sunano, Toyota (JP); Takayuki Natori, Toyota (JP); Riku Tadokoro, Toyota (JP)

(73) Assignees: Sumitomo Electric Hardmetal Corp., Itami (JP); Toyota Jidosha Kabushiki Kaisha, Toyota (JP)

( * ) Notice: Subject to any disclaimer, the term of this patent is extended or adjusted under 35 U.S.C. 154(b) by 541 days.

(21) Appl. No.: 17/764,200

(22) PCT Filed: Mar. 8, 2021

(86) PCT No.: PCT/JP2021/008992
§ 371 (c)(1),
(2) Date: Mar. 28, 2022

(87) PCT Pub. No.: WO2022/190171
PCT Pub. Date: Sep. 15, 2022

(65) Prior Publication Data
US 2023/0173593 A1 Jun. 8, 2023

(51) Int. Cl.
*B23B 51/02* (2006.01)
*B23B 51/06* (2006.01)

(52) U.S. Cl.
CPC ............. *B23B 51/02* (2013.01); *B23B 51/06* (2013.01); *B23B 2251/44* (2013.01); *B23B 2251/443* (2013.01); *Y10T 408/9097* (2015.01)

(58) Field of Classification Search
CPC . B23B 51/02; B23B 2251/08; B23B 2251/12; B23B 2251/443; B23B 51/08;
(Continued)

(56) References Cited

U.S. PATENT DOCUMENTS

| 5,486,075 A | * | 1/1996 | Nakamura | B23B 51/02 408/230 |
| 2010/0054884 A1 | * | 3/2010 | Masuda | B23B 51/02 408/230 |

(Continued)

FOREIGN PATENT DOCUMENTS

| DE | 3325149 A1 | 1/1985 | |
| EP | 1632301 A2 * | 3/2006 | ............. B23B 51/02 |

(Continued)

OTHER PUBLICATIONS

"Contiguous"; Dictionary.com; https://www.dictionary.com/browse/contiguous; archived at Wayback Machine (https://web.archive.org/web/20160316093113/https://www.dictionary.com/browse/contiguous); Mar. 16, 2016.*

(Continued)

*Primary Examiner* — Sunil K Singh
*Assistant Examiner* — Michael Vitale
(74) *Attorney, Agent, or Firm* — XSENSUS LLP

(57) ABSTRACT

The outer peripheral surface is provided with a first margin contiguous to each of the cutting edge and the flank face, and a second margin that is located on the rear side with respect to the first margin in a rotation direction and that is separated from each of the flank face and the thinning face. An outer peripheral portion of the first margin and an outer peripheral portion of the second margin have respective back tapers having the same angle. In a direction parallel to the axial line, a distance between a front end of the first margin and a front end of the second margin is more than or equal to 3 mm and less than or equal to 5 mm.

11 Claims, 12 Drawing Sheets

(58) Field of Classification Search
CPC ............ B23B 2251/41; B23B 2251/44; B23B 2251/241; B23B 2251/446; Y10T 408/9097
USPC ........................................................ 408/230
See application file for complete search history.

(56) References Cited

U.S. PATENT DOCUMENTS

| | | | |
|---|---|---|---|
| 2011/0211924 | A1 | 9/2011 | Yanagida et al. |
| 2012/0201619 | A1* | 8/2012 | Olsson ...................... B24B 3/32 408/230 |
| 2015/0283625 | A1 | 10/2015 | Sato et al. |
| 2020/0282472 | A1* | 9/2020 | Yamamoto .............. B23B 51/02 |
| 2020/0324348 | A1* | 10/2020 | Yoshioka ................ B23B 51/02 |

FOREIGN PATENT DOCUMENTS

| | | | | |
|---|---|---|---|---|
| EP | 2484470 | A1 * | 8/2012 | ............. B23B 51/02 |
| JP | 07040116 | A * | 2/1995 | |
| JP | 2000-263307 | A | 9/2000 | |
| JP | 2004195560 | A * | 7/2004 | ............. B23B 51/02 |
| JP | 2007-15073 | A | 1/2007 | |
| JP | 2010-64186 | A | 3/2010 | |
| JP | 2013-515621 | A | 5/2013 | |
| JP | 2018-114589 | A | 7/2018 | |
| JP | 2020-44616 | A | 3/2020 | |
| JP | 6797873 | B2 | 12/2020 | |
| WO | 2011/090551 | A2 | 7/2011 | |
| WO | 2014/069179 | A1 | 5/2014 | |
| WO | WO-2019021785 | A1 * | 1/2019 | ............. B23B 51/00 |
| WO | WO-2019049257 | A1 * | 3/2019 | ............. B23B 51/02 |

OTHER PUBLICATIONS

Omori, "An Introduction to Roundness Measurement", Journal of the Japan Society for Precision Engineering, vol. 82, No. 9, 2016, pp. 803-806 (13 pages including English Translation).

* cited by examiner

DRILL

CROSS-REFERENCE TO RELATED APPLICATION

The present application is based on PCT filing PCT/JP2021/008992, filed Mar. 8, 2021, the entire contents of which are incorporated herein by reference.

TECHNICAL FIELD

The present disclosure relates to a drill.

BACKGROUND ART

Japanese Patent Laying-Open No. 2020-44616 (PTL 1) describes a drill having a first margin and a second margin.

CITATION LIST

Patent Literature

PTL 1: Japanese Patent Laying-Open No, 2020-44616

SUMMARY OF INVENTION

A drill according to the present disclosure is a drill rotatable about an axial line, and includes a flank face, a thinning face, an outer peripheral surface, and a wart discharging surface. The thinning face is contiguous to the flank face. The outer peripheral surface is contiguous to each of the flank face and the thinning face. The swarf discharging surface is contiguous to each of the flank face and the outer peripheral surface. A ridgeline between the flank face and the swarf discharging surface forms a coning edge. The outer peripheral surface is provided with a first margin contiguous to each of the cutting edge and the flank face, and a second margin that is located on a rear side with respect to the first margin in a rotation direction and that is separated from each of the flank face and the thinning face. An outer peripheral portion of the first margin and an outer peripheral portion of the second margin have respective back tapers having the same angle. In a direction parallel to the axial line, a distance between a front end of the first margin and a front end of the second margin is more than or equal to 3 mm and less than or equal to 5 mm.

DETAILED DESCRIPTION

Figure 1:
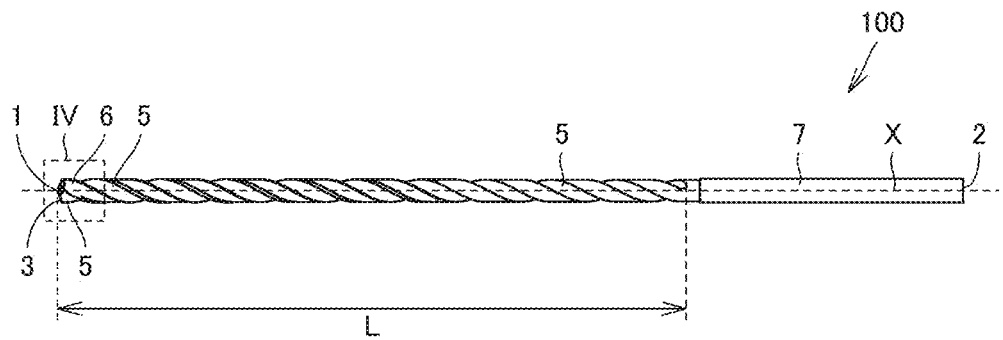
FIG. 1 is a schematic plan view showing a configuration of a drill according to a first embodiment.

Problem to be Solved by the Present Disclosure

It is an object of the present disclosure to provide a drill to improve a roundness or a hole while maintaining rigidity to be high.

Advantageous Effect of the Present Disclosure

According to the present disclosure, there can be provided a drill to improve a roundness of a hole while maintaining rigidity to be high.

DESCRIPTION OF EMBODIMENTS

First, an overview of embodiments of the present disclosure will be described.

(1) A drill 100 according to the present disclosure is a drill 100 rotatable about an axial line X, and includes a flank face 8, a thinning face 9, an outer peripheral surface 6, and a swarf discharging surface 5. Thinning face 9 is contiguous to flank face 8. Outer peripheral surface 6 is contiguous to each of flank face 8 and thinning face 9. Swarf discharging surface 5 is contiguous to each of flank face 8 and outer peripheral surface 6. A ridgeline between flank face 8 and swarf discharging surface 5 forms a cutting edge 3. Outer peripheral surface 6 is provided with a first margin 10 contiguous to each of cutting edge 3 and flank face 8, and a second margin 20 that is located on a rear side with respect to first margin 10 in a rotation direction and that is separated from each of flank face 8 and thinning face 9. An outer peripheral portion of first margin 10 and an outer peripheral portion of second margin 20 have respective back tapers having the same angle. In a direction parallel to axial line X, a distance between a front end of first margin 10 and a front end of second margin 20 is more than or equal to 3 mm and less than or equal to 5 mm.

(2) In drill 100 according to (1), the front end of second margin 20 may extend along the direction perpendicular to axial line X when viewed in the direction perpendicular to axial line X.

(3) In drill 100 according to (1) or (2), in the direction parallel to axial line X, a length of swarf discharging surface 5 may be 10 times or more and 55 times or less as large as a diameter of drill 100.

(4) In drill 100 according to any one of (1) to (3), second margin 20 may be separated from swarf discharging surface 5.

Details of Embodiments of the Present Disclosure

Hereinafter, the embodiments of the present disclosure (hereinafter, also referred to as "the present embodiment")

will be described in detail with reference to figures. It should be noted that in the below-described figures, the same or corresponding portions are denoted by the same reference characters, and will not be described repeatedly.

First Embodiment

First, a configuration of a drill 100 according to a first embodiment will be described. FIG. 1 is a schematic plan view showing the configuration of drill 100 according to the first embodiment. As shown in FIG. 1, drill 100 according to the first embodiment mainly includes a front end 1, a rear end 2, flank faces 8, thinning faces 9, outer peripheral surfaces 6, swarf discharging surfaces 5, and a shank 7. Drill 100 according to the first embodiment is a drill 100 for processing a metal. As shown in FIG. 1, each of outer peripheral surfaces 6 is provided in the form of a helix around an axial line X. Outer peripheral surface 6 is contiguous to swarf discharging surface 5. Swarf discharging surface 5 forms a flute. Swarf discharging surface 5 is provided in the form of a helix around axial line X. A cutting edge 3 is provided on the front end side of drill 100.

Front end 1 of drill 100 is a portion to face a workpiece. Rear end 2 of drill 100 is a portion to face a tool main spindle that rotates drill 100. Shank 7 is a portion to be attached to the tool main spindle. Axial line X extends through front end 1 and rear end 2. A direction along axial line X is an axial direction. A direction perpendicular to the axial direction is a radial direction. In the present specification, a direction from front end 1 toward rear end 2 is referred to as "rear side in the axial direction" On the contrary, a direction from rear end 2 toward front end 1 is referred to as "front side in the axial direction", drill 100 is rotatable about axial line X.

Figure 2:
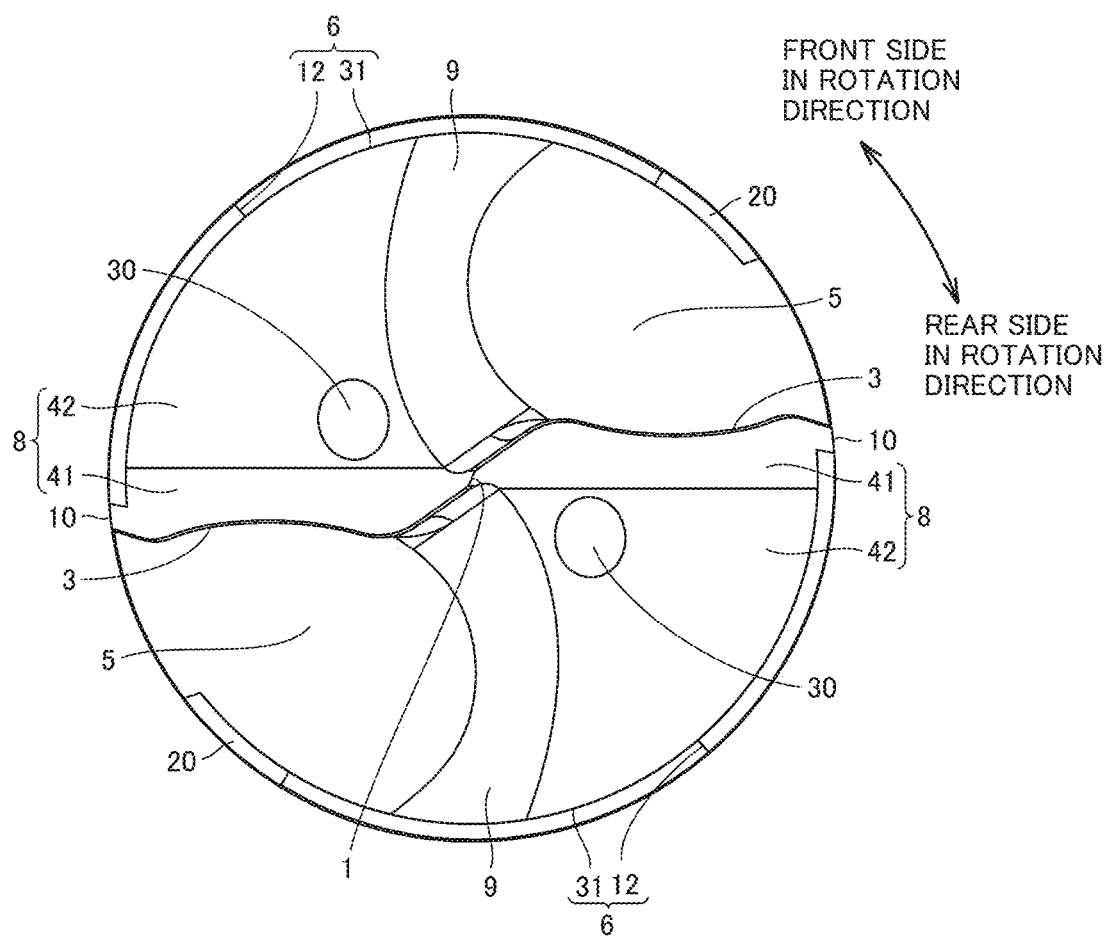
FIG. 2 is a schematic front view showing the configuration of the drill according to the first embodiment.

FIG. 2 is a schematic front view showing the configuration or drill 100 according to the first embodiment. As shown in FIG. 2, drill 100 further includes flank faces 8 and thinning faces 9. A ridgeline between each flank face 8 and each swarf discharging surface 5 forms cutting edge 3. Swarf discharging surface 5 in the vicinity of cutting edge 3 functions as a rake face. Thinning face 9 is contiguous to flank face 8. Thinning face 9 is located on the rear side with respect to flank face 8 in a rotation direction. Flank face 8 has a first region 41 and a second region 42. First region 41 forms cutting edge 3. Second region 42 is contiguous to first region 41. Second region 42 is located on the rear side with respect to first region 41 in the rotation direction. Second region 42 is contiguous to thinning face 9. Second region 42 is located between first region 41 and thinning face 9.

As shown in FIG. 2, coolant holes 30 may be provided in flank faces 8. Each of coolant holes 30 may be provided in second region 42, for example. As shown in FIG. 2, when viewed along axial line X, a boundary between second region 42 and thinning face 9 is in the form of a curve at thinning), for example. As another configuration, when viewed along axial line X, the boundary between second region 42 and thinning face 9 may be in the form of a straight line (X thinning), for example. Outer peripheral surface 6 is provided with a first margin 10 and a second margin 20. Second margin 20 is provided on the rear side with respect to first margin 10 in the rotation direction. Second margin 20 is separated from first margin 10. Outer peripheral surface 6 has an outer peripheral region 31. Outer peripheral region 31 is located between first margin 10 and second margin 20. As shown in FIG. 2, when viewed along axial line X, outer peripheral region 31 is in the form of an arc, for example.

Figure 3:
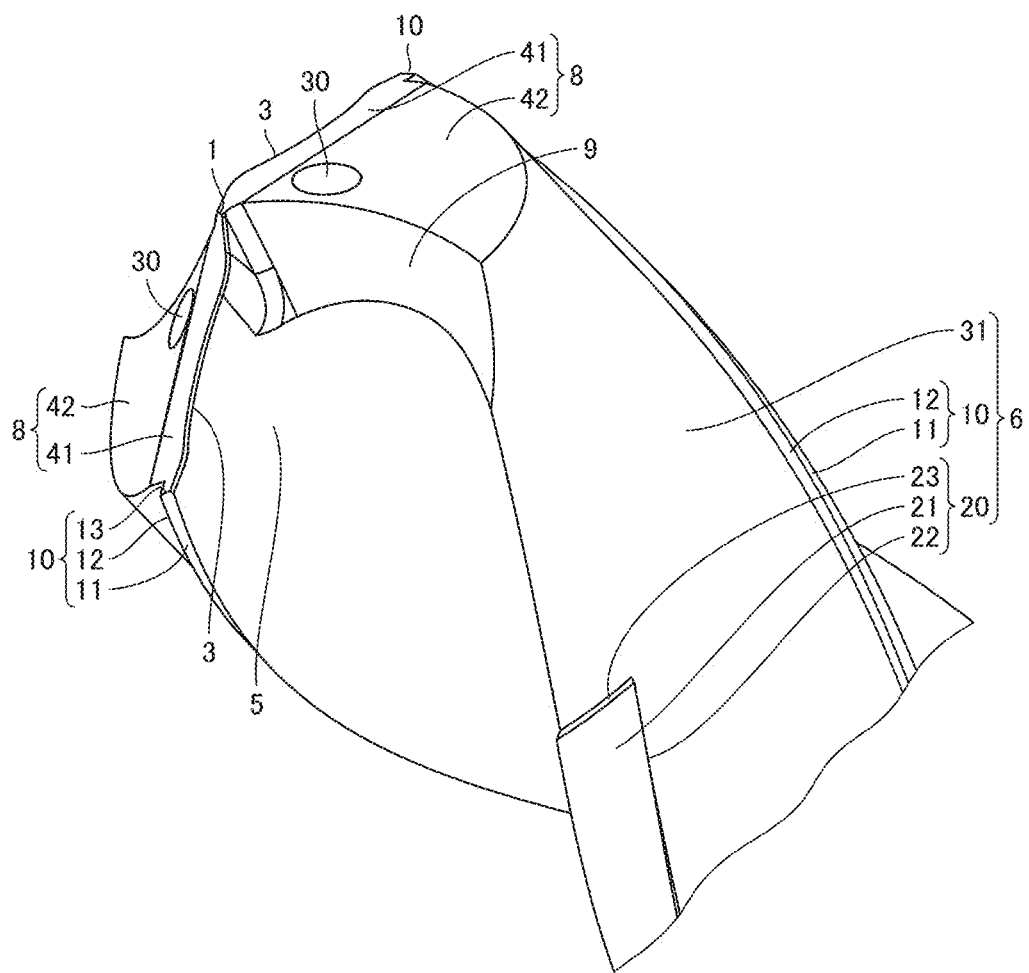
FIG. 3 is a partial enlarged perspective view showing the configuration of the drill according to the first embodiment.

FIG. 3 is a partial enlarged perspective view showing the configuration of drill 100 according to the first embodiment. As shown in FIG. 3, outer peripheral surface 6 is contiguous to each of flank face 8 and thinning face 9. Swarf discharging surface 5 is contiguous to each of flank face 8 and outer peripheral surface 6. Thinning face 9 is contiguous to swarf discharging surface 5. First margin 10 is contiguous to each of cutting edge 3 and flank face 8. Specifically, first margin 10 is contiguous to a portion of first region 41 of flank face 8. First margin 10 is contiguous to a boundary between swarf discharging surface 5 and outer peripheral surface 6.

First margin 10 has a first front end 13, a first outer peripheral portion 11, and a first side surface portion 12. First front end 13 is contiguous to cutting edge 3. First outer peripheral portion 11 is contiguous to first front end 13 First outer peripheral portion 11 is located on the rear end 2 side with respect to first front end 13 in the direction along axial line X. First side surface portion 12 is contiguous to first front end 13. First side surface portion 12 is located on the rear end 2 side with respect to first front end 13 in the direction along axial line X. First side surface portion 12 is contiguous to each of first outer peripheral portion 11 and outer peripheral region 31. First side surface portion 12 is located on the rear side with respect to first outer peripheral portion 11 in the rotation direction. From another viewpoint, it can be said that first outer peripheral portion 11 is located between swarf discharging surface 5 and first side surface portion 12 in the rotation direction.

Second margin 20 is separated from each of flank face 8 and thinning face 9. Second margin 20 is contiguous to the boundary between swarf discharging surface 5 and outer peripheral surface 5. Second margin 20 has a second front end 23, a second outer peripheral portion 21, and a second side surface portion 22. Second front end 23 is contiguous to outer peripheral region 31. Second outer peripheral portion 21 is contiguous to second front end 23. Second outer peripheral portion 21 is located on the rear end 2 side with respect to second front end 23 in the direction along axial line X. Second side surface portion 22 is contiguous to second front end 23. Second side surface portion 22 is located on the rear end 2 side with respect to second front end 23 in the direction along axial line X. Second side surface portion 22 is contiguous to each of second outer peripheral portion 21 and outer peripheral region 31. Second side surface portion 22 is located on the front side with respect to second outer peripheral portion 21 in the rotation direction. From another viewpoint, it can be said that second outer peripheral portion 21 is located between swarf discharging surface 5 and second side surface portion 22 in the rotation direction.

Figure 4:
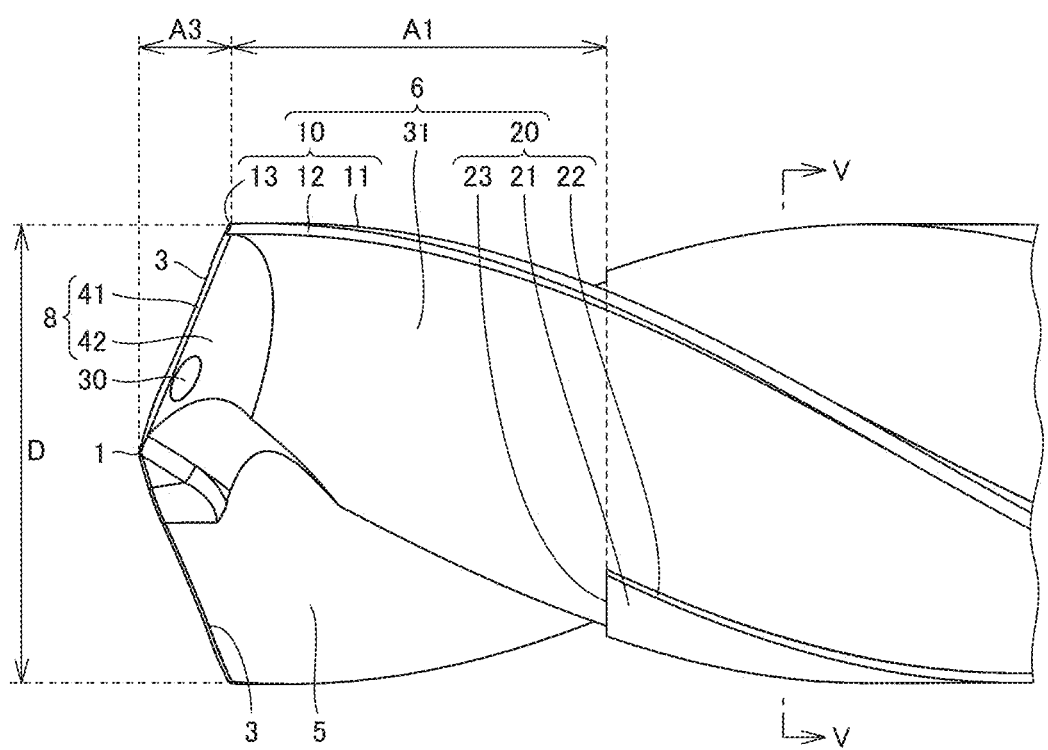
FIG. 4 is an enlarged plan view showing a region IV of FIG. 1.

FIG. 4 is an enlarged plan view showing a region IV of FIG. 1. When a first distance A1 represents a distance between the front end (first front end 13) of first margin 10 and the front end (second front end 231 of second margin 20 in the direction parallel to axial line X, first distance A1 is more than or equal to 3 mm and less than or equal to 5 mm. The lower limit of first distance A1 is not particularly limited, but may be more than or equal to 3.2 mm or more than or equal to 3.4 mm, for example. The upper limit of first distance A1 is not particularly limited, but may be less than or equal to 4.8 mm or less than or equal to 4.6 mm, for example.

As shown in FIG. 4, a third distance A3 represents a distance between front end 1 of drill 100 and first front end 13 of first margin 10 in the direction parallel to axial line X. As shown in FIG. 4, third distance A3 may be shorter than first distance A1. As shown in FIG. 4, when viewed in the direction perpendicular to axial line X, second front end 23 of second margin 20 may extend in the direction perpendicular to axial line X. From another viewpoint, it can be said that second front end may be parallel to a plane perpendicular to axial line X. Second front end 23 extends along the rotation direction of the drill.

As shown in FIG. 4, drill 100 according to the first embodiment has two cutting edges 3. When viewed in the direction perpendicular to axial line X and perpendicular to a line segment that connects the outer peripheral end portion of first cutting edge 3 on one side to the outer peripheral end portion of second cutting edge 3 on the other side, a distance between the outer peripheral end portion of first cutting edge 3 on one side and the outer peripheral end portion of second cutting edge 3 on the other side is represented by diameter D of drill 100. Diameter D of drill 100 is not particularly limited, but is, for example, 5 mm. As shown in FIG. 1, a length L of swarf discharging surface 5 in the direction parallel to axial line X is, for example, 10 times or more and 55 times or less as large as diameter D of drill 100. The lower limit of length L of swarf discharging surface 5 is not particularly limited, but may be, for example, 15 times or more or 20 times or more as large as diameter D of drill 100. The upper limit of length L of swarf discharging surface 5 is not particularly limited, but may be, for example, 50 times or less or 45 times or less as large as diameter D of drill 100.

Figure 5:
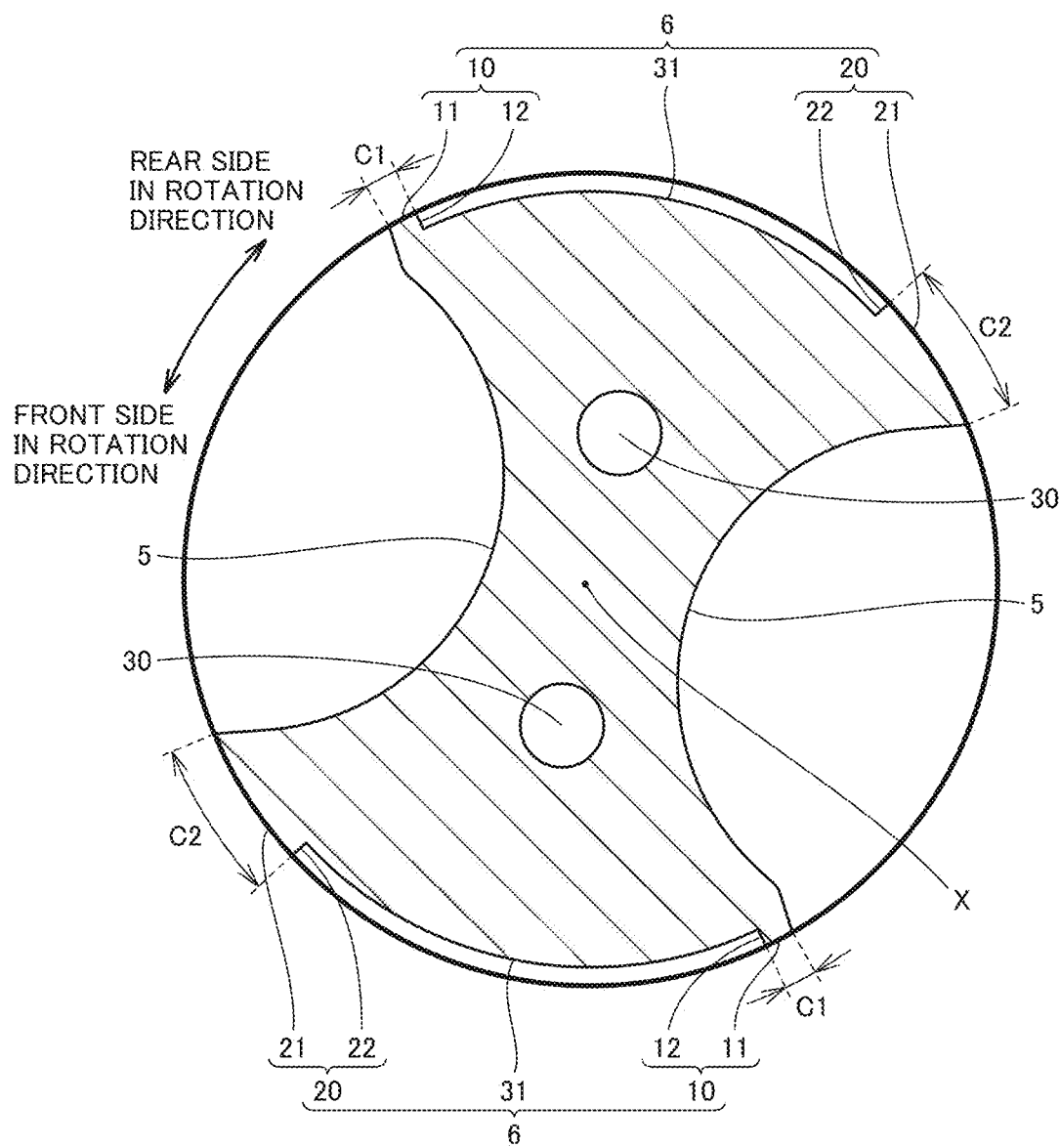
FIG. 5 is a schematic cross sectional view taken along a line V-V of FIG. 4.

FIG. 5 is a schematic cross sectional view taken along a line V-V of FIG. 4. The cross section shown in FIG. 5 is a cross section that is perpendicular to axial line X and that intersects each of first margin 10 and second margin 20. As shown in FIG. 5, the width (second width C2) of second margin 20 may be larger than the width (first width C1) of first margin 10 in the rotation direction. The lower limit of second width C2 is not particularly limited, but may be 1.5 times or more or 2 times or more as large as first width C1, for example.

As shown in FIG. 5, outer peripheral region 31 is contiguous to each of first side surface portion 12 and second side surface portion 22. First side surface portion 12 is located on the front side with respect to outer peripheral region 31 in the rotation direction. Second side surface portion 22 is located on the rear side with respect to outer peripheral region 31 in the rotation direction. First outer peripheral portion 11 is located on the outer side with respect to outer peripheral region 31 in the radial direction. Similarly, second outer peripheral portion 21 is located on the outer side with respect to outer peripheral region 31 in the radial direction. In the radial direction, the position of first outer peripheral portion 11 is the same as the position of second outer peripheral portion 21. From another viewpoint, it can be said that in the cross section perpendicular to axial line X, a distance between axial line X and first outer peripheral portion 11 is the same as a distance between axial line X and second outer peripheral portion 21.

Figure 6:
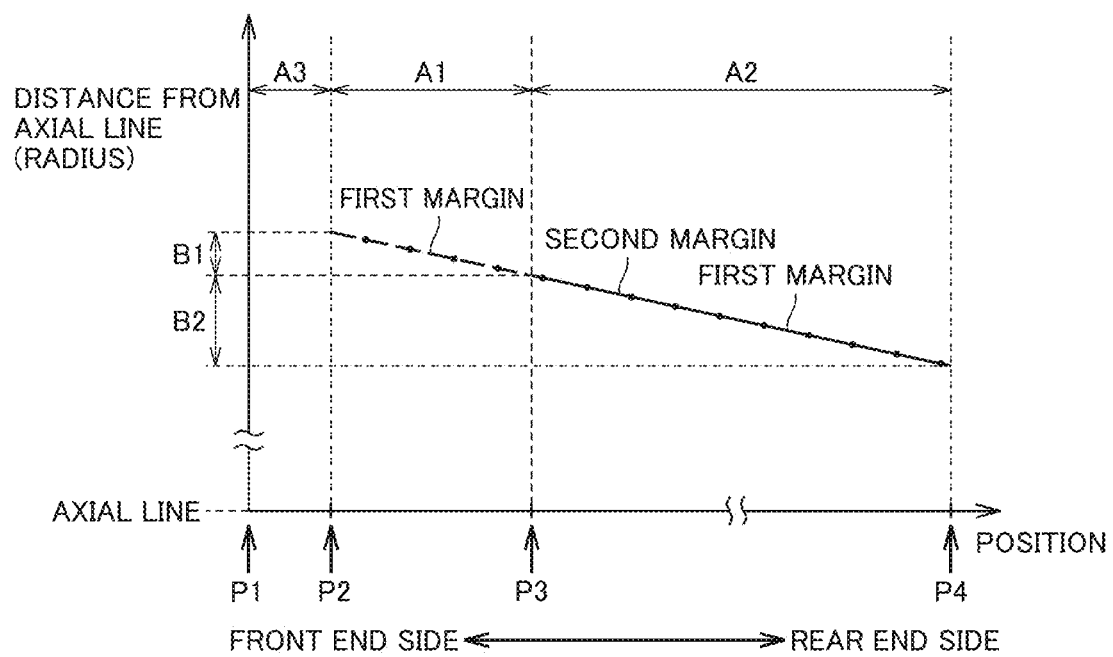
FIG. 6 is a schematic diagram showing a relation between a distance from an axial line and a position in an axial direction.

FIG. 6 is a schematic diagram showing a relation between a distance from axial line X and a position in the direction of axial line X. In FIG. 6, the horizontal axis represents a position in the axial direction. The left side of FIG. 6 corresponds to the front end side of drill 100. The tight side of FIG. 6 corresponds to the rear end side of drill 100. In FIG. 6, the vertical axis represents a distance from axial line X. A first position P1 corresponds to the position of front end 1 of drill 100. A second position P2 corresponds to the position of the front end (first front end 13) of first margin 10. In the direction parallel to axial line X, second position P2 is located between first position P1 and rear end 2 of drill 100. A third position P3 corresponds to the position of the front end (second front end 23) of second margin 20. In the direction parallel to axial line X, third position P3 is located between second position P2 and rear end 2 of drill 100. A fourth position P4 corresponds to the position of the rear end of first margin 10 and the position of the rear end of second margin 20. In the direction parallel to axial line X, fourth position P4 is located between third position P3 and rear end 2 of drill 100.

As shown in FIG. 6, first margin 10 is provided in a region ranging from second position P2 to fourth position P4 in the direction parallel to axial line X. Second margin 20 is provided in a region ranging from third position P3 to fourth position P4 in the direction parallel to axial line X. A second distance A2 represents a distance from the front end (second front end 23) of second margin 20 to the rear end of second margin 20 in the direction parallel to axial line X. Second distance A2 may be longer than first distance A1. Second distance A2 corresponds to the length of second margin 20 in the direction parallel to axial line X. The total of first distance A1 and second distance A2 corresponds to the length of first margin 10 in the direction parallel to axial line X. The length of first margin 10 may be longer than the length of second margin 20 in the direction parallel to axial line X.

Each of first outer peripheral portion 11 of first margin 10 and second outer peripheral portion 23 of second margin 20 has a back taper. The angle of the back taper of first outer peripheral portion 11 of first margin 10 is the same as the angle of the back taper of second outer peripheral portion 21 of second margin 20, in other words, first outer peripheral portion 11 of first margin 10 and second outer peripheral portion 21 of second margin 20 have respective back tapers having the same angle. From another viewpoint, it can be said that first outer peripheral portion 11 and second outer peripheral portion 21 are located on the same conical surface.

As shown in FIG. 6, a first length B1 represents a value obtained by subtracting a distance between axial line X and first outer peripheral portion 11 of first margin 10 at third position P3 from a distance between axial line X and first outer peripheral portion 11 of first margin 10 at second position P2. The tangent of the angle of the back taper of the outer peripheral portion of first margin 10 represents a value obtained by dividing first length B1 by first distance A1. Similarly, a second length B2 represents a value obtained by subtracting a distance between axial line X and second outer peripheral portion 21 of second margin 20 at fourth position P4 from a distance between axial line X and second outer peripheral portion 21 of second margin 20 at third position P3. The tangent of the angle of the back taper of the outer peripheral portion of second margin 20 represents a value obtained by dividing second length B2 by second distance A2. Each of the angle of the back taper of the outer peripheral portion of first margin 10 and the angle of the back taper of the outer peripheral portion of second margin 20 is, for example, arctan (0.35 mm/100 mm/2) (unit: rad). Each of the angle of the back taper of the outer peripheral portion of first margin 10 and the angle of the back taper of the outer peripheral portion of second margin 20 is, for example, 0.00175 rad.

As shown in FIG. 6, a distance between first outer peripheral portion 11 of first margin 10 and axial line X in the radial direction is monotonously decreased in the direction toward the rear end 2 side. Similarly, a distance between second outer peripheral portion 21 of second margin 20 and axial line X in the radial direction is monotonously decreased in the direction toward the rear end 2 side. A distance between axial line X and first, outer peripheral portion 11 at second position P2 in the radial direction is larger than a distance between axial line X and second outer peripheral portion 21 at third position P3 in the radial direction. The distance between axial line X and first outer peripheral portion 11 at second position P2 in the radial direction is larger than a distance between axial line X and first outer peripheral portion 11 at third position P3 in the radial direction. The distance between axial line X and first outer peripheral portion 11 at third position P3 in the radial direction is the same as the distance between axial line X and second outer peripheral portion 21 at third position P3 in the radial direction.

Similarly, the distance between axial line X and first outer peripheral portion 11 at third position P3 in the radial direction is larger than a distance between axial line X and second outer peripheral portion 21 at fourth position P4 in the radial direction. The distance between axial line X and first outer peripheral portion 11 at third position P3 in the radial direction is larger than the distance between axial line X and first outer peripheral portion 11 at fourth position P4 in the radial direction. The distance between axial line X and first outer peripheral portion 11 at fourth position P4 in the radial direction is the same as the distance between axial line X and second outer peripheral portion 21 at fourth position P4 in the radial direction.

Second Embodiment

Next, a configuration of a drill 100 according to a second embodiment will be described. The configuration of drill 100 according to the second embodiment is different from the configuration of drill 100 according to the first embodiment in that the width of second margin 20 is large, and the other points are the same as those in the configuration of chill 300 according to the first embodiment. Hereinafter, the difference from the configuration of drill 100 according to the first embodiment will be mainly described.

Figure 7:
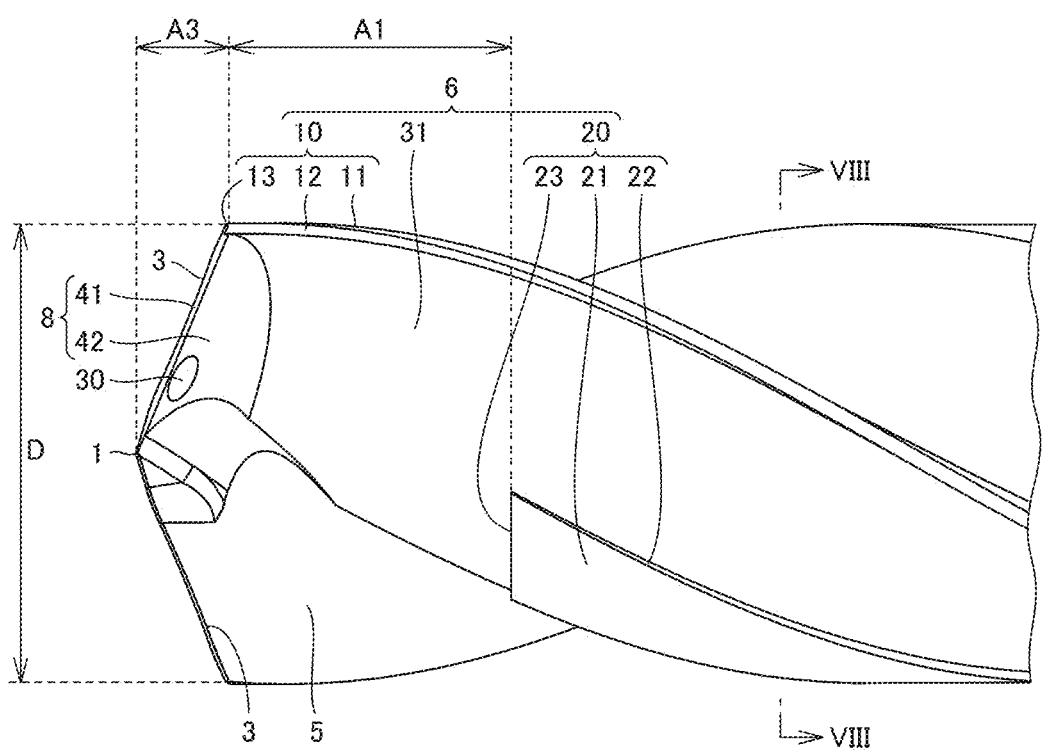
FIG. 7 is an enlarged schematic plan view showing a configuration of a drill according to a second embodiment.
Figure 8:
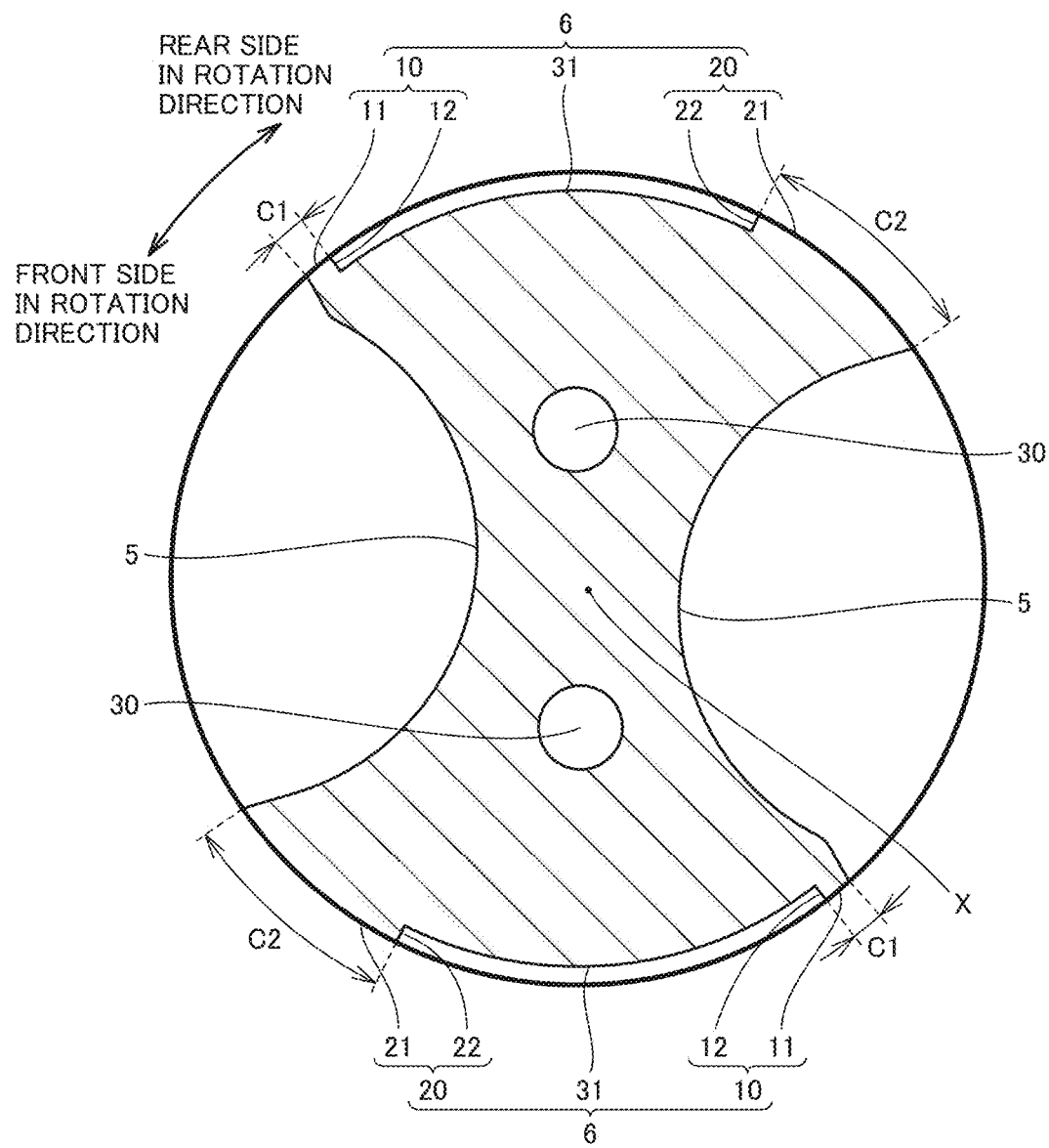
FIG. 8 is a schematic cross sectional view taken along a line VIII-VIII of FIG. 7.

FIG. 7 is an enlarged schematic plan view showing the configuration of drill 100 according to the second embodiment. FIG. 8 is a schematic cross sectional view taken along a line VIII-VIII of FIG. 7. The cross section shown in FIG. 8 is a cross section that is perpendicular to axial line X and that intersects each of first margin 10 and second margin 20. As shown in FIGS. 7 and 8, the width (second width C2) of second margin 20 of drill 100 according to the second embodiment is larger than the width (second width C2) of second margin 20 of drill 100 according to the first embodiment. As shown in FIG. 8, the lower limit of second width C2 is not particularly limited, but may be, for example, 3 times or more or 4 times or more as large as first width C1. The upper limit of second width C2 is not particularly limited, but may be, for example, 8 times or less or 6 times or less as large as first width C1.

Third Embodiment

Next, a configuration of a drill 100 according to a third embodiment will be described. The configuration of drill 100 according to the third embodiment is different from the configuration of drill 100 according to the first embodiment in that second margin 20 is separated from swarf discharging surface 5, and the other points are the same as those in the configuration of drill 100 according to the first embodiment. Hereinafter, the difference from the configuration of drill 100 according to the first embodiment will be mainly described.

Figure 9:
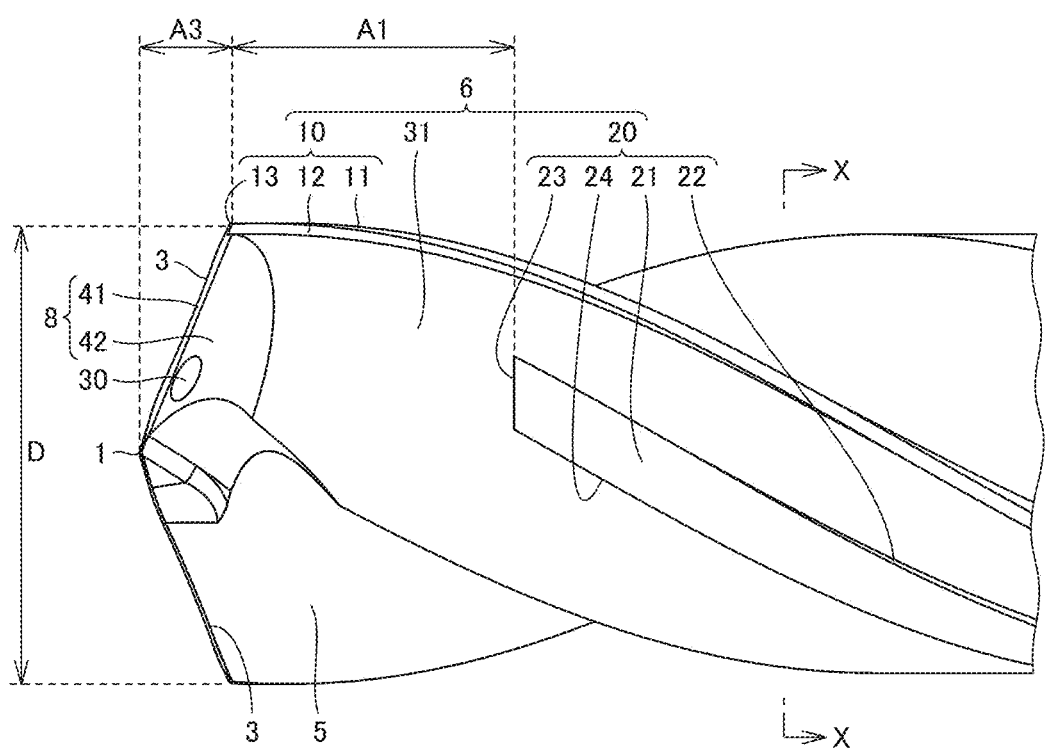
FIG. 9 is an enlarged schematic plan view showing a configuration of a drill according to a third embodiment.
Figure 10:
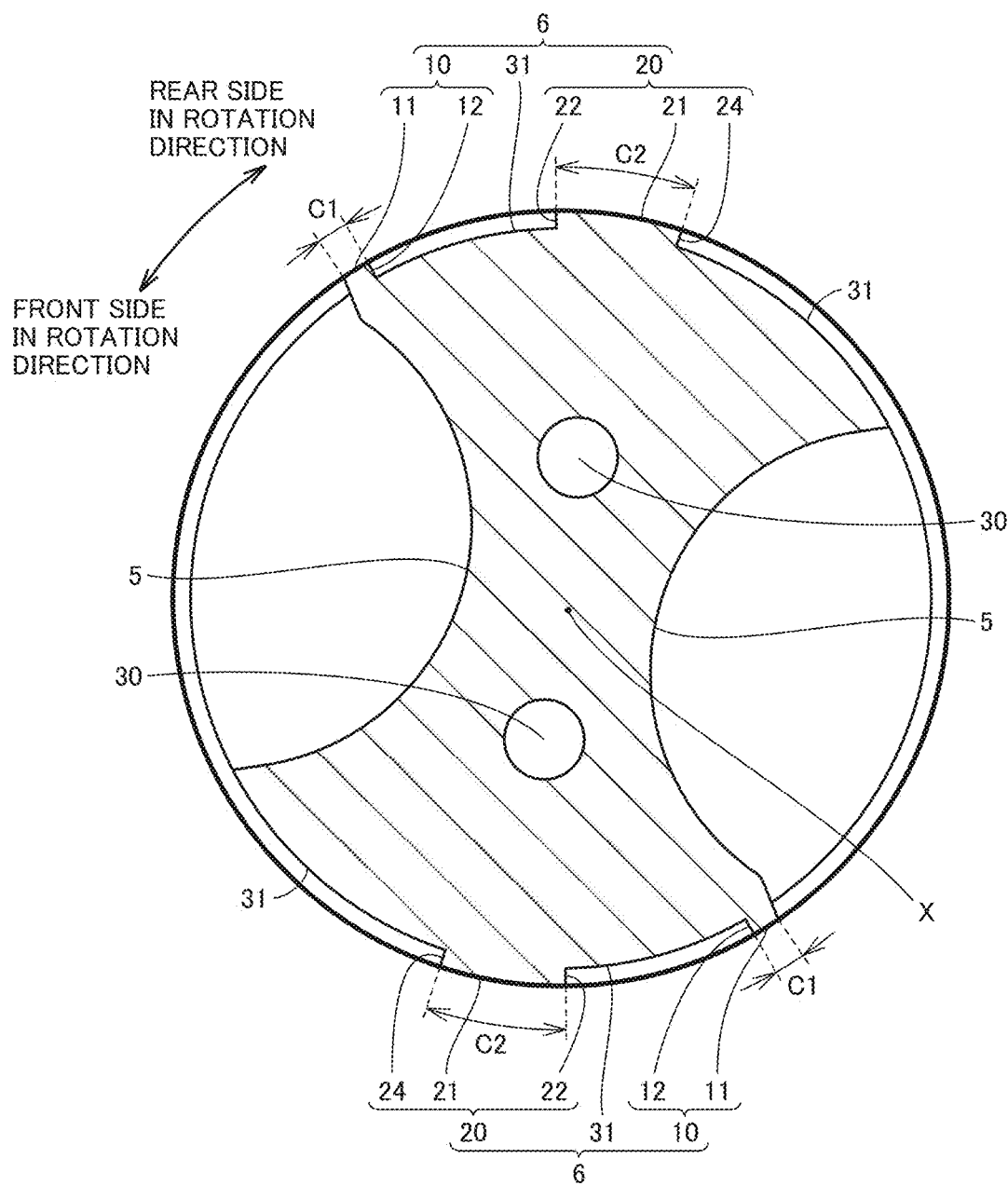
FIG. 10 is a schematic cross sectional view taken along a line IX-IX of FIG. 9.

FIG. 9 is an enlarged schematic plan view showing the configuration of drill 100 according to the third embodiment. FIG. 10 is a schematic cross sectional view taken along a line IX-IX of FIG. 9. The cross section shown in FIG. 10 is a cross section that is perpendicular to axial line X and that intersects each of first margin 10 and second margin 20. As shown in FIGS. 9 and 10, second margin 20 of drill 100 according to the third embodiment is separated from swan discharging surface 5. From another viewpoint, it can be said that second margin 20 is separated from a boundary line between swarf discharging surface 5 and outer peripheral surface 6.

As shown in FIG. 10, second margin 20 has a second outer peripheral portion 21, a second side surface portion 22, and a third side surface portion 24. Second outer peripheral portion 21 is contiguous to each of second side surface portion 22 and third side surface portion 24. Third side surface portion 24 is located on the rear side with respect to second side surface portion 22 in the rotation direction. Third side surface portion 24 is located opposite to second side surface portion 22. In the rotation direction, second outer peripheral portion 21 is located between second side surface portion 22 and third side surface portion 24. Second side surface portion 22 is contiguous to outer peripheral regions 31. Third side surface portion 24 is contiguous to outer peripheral regions 31 on the rear side with respect to second outer peripheral portion 21 in the rotation direction. As shown in FIG. 10, outer peripheral regions 31 are provided beside the both sides of second margin 20 in the rotation direction.

Figure 11A:
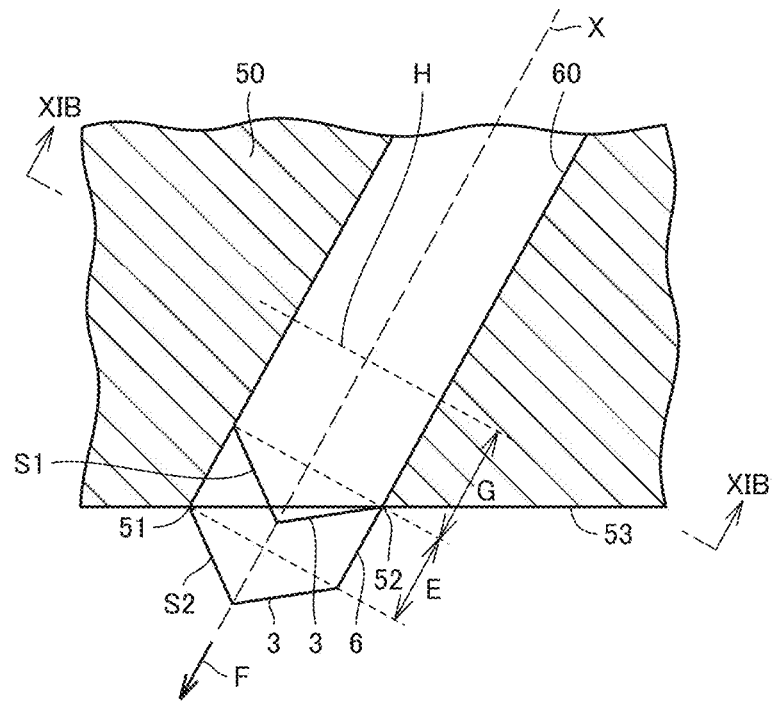
FIG. 11A is a schematic partial cross sectional view showing a step of performing an oblique through-hole forming process onto a workpiece using, a drill.

FIG. 11A is a schematic partial cross sectional view showing a step of performing an oblique through-hole forming process onto a workpiece using drill 100. As shown in FIG. 11A, a through hole 60 is formed in a workpiece 50 using drill 100. Workpiece 50 has an exit end surface 53. Drill 100 is moved along a moving direction F parallel to the plane of sheet while rotating about axial line X. Moving direction F of drill 100 is inclined with respect to exit end surface 53. Further, moving direction F of drill 100 is inclined with respect to a plane perpendicular to the plane of sheet and perpendicular to exit end surface 53. Through hole 60 has a first exit end portion 51 and a second exit end portion 52. When drill 100 is at a position of a first state S1, the outer peripheral end of cutting edge 3 is located at second exit end portion 52. When drill 100 is at a position of a second state S2, the outer peripheral end of cutting edge 3 is located at first exit end portion 51.

A roundness is defined by a magnitude of deviation of a round-shaped object from a geometrically correct circle as defined in JIS (Japanese Industrial Standards) B0621-1984. The roundness is represented as a difference between radii of two concentric geometric circles in the case where a distance between the two circles is minimum when the round-shaped object is sandwiched between the two concentric geometric circles. The unit of the roundness is μm.

Figure 11B:
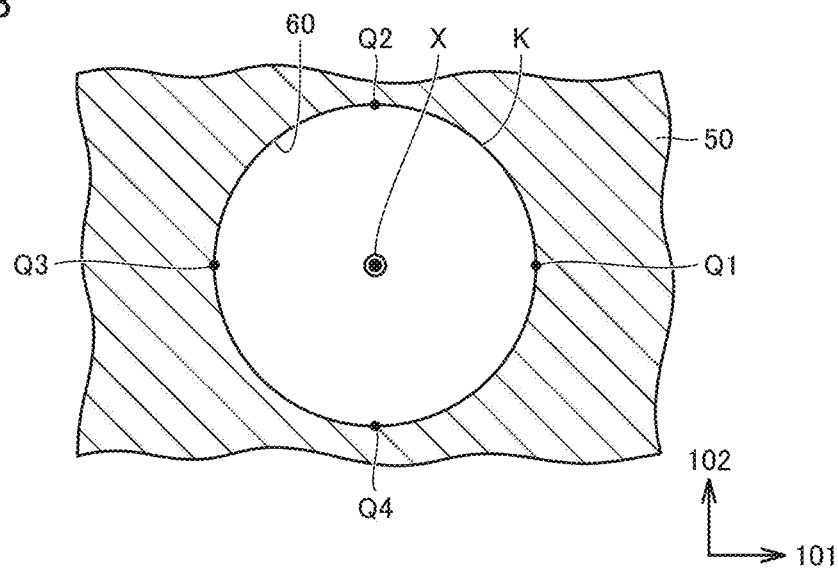
FIG. 11B is a schematic partial cross sectional view showing a method of measuring a roundness of a through hole.

FIG. 11B is a schematic partial cross sectional view showing a method of measuring the roundness of through hole 60. FIG. 11B is a schematic cross sectional view taken along a line XIB-XIB of FIG. 11A. The cross section shown in FIG. 11B is a view of a cross section that is perpendicular to axial line X and that intersects a plane H separated by a fifth distance G from second exit end portion 52 when viewed in a direction opposite to moving direction F. Fifth distance G is, for example, 5 mm. A first direction 101 represents a direction obtained by projecting, onto plane H, a direction that is perpendicular to axial line X and that extends from axial line X toward second exit end portion 52. A second direction 102 represents a direction obtained by rotating first direction 101 counterclockwise by 90° in plane H. In plane H, axial line X represents the origin, I represents a coordinate in first direction 101, J represents a coordinate in second direction 102, and a position in plane H is expressed as (I, J). An intersection line K represents an intersection line between workpiece 50 and through hole 60 in plane H. By measuring the positions of four points disposed on intersection line K at equal angles with respect to axial line X in plane H, the roundness is found.

Specifically, the roundness is found as follows. An intersection point Q1 represents an intersection point, between intersection line K and a direction from axial line X toward first direction 101. An intersection point Q2 represents an intersection point between intersection line K and a direction from axial line X toward second direction 102. An intersection point Q3 represents an intersection point between intersection line K and a direction extending opposite to first direction 101 from axial line X. An intersection point Q4 represents an intersection point between intersection line K and a direction extending opposite to second direction 102 from axial line X. First, the coordinates of intersection Q1, intersection Q2, intersection Q3, and intersection Q4 are measured as (I1, 0), (0, J2), (I3, 0), and (0, J4), respectively. Next, respective distances from axial line X serving as the origin to these four points are calculated as $\sqrt{(I1^2)}$, $\sqrt{(J2^2)}$, $\sqrt{(I3^2)}$ and $\sqrt{(J4^2)}$ by using the coordinates of intersection point Q1, intersection point Q2, intersection point Q3, and intersection point Q4. A difference between the maximum value and the minimum value of the calculated distances represents a provisional value of the roundness. In the measurement of roundness, the center (I0, J0) intersection line K does not necessarily coincide with axial line X, i.e., the origin (0, 0). Respective distances between the provisionally determined center of intersection line K and intersection points Q1, Q2, Q3, and Q4 are calculated, and the center (I0, J0) of intersection line K is determined to attain a minimum objective function with a difference between the maximum value and the minimum value of the calculated distances being regarded as the objective function. When the objective function is minimum, the in minimum value of the objective function represents the roundness.

The roundness measured as described above is referred to as "minimum zone roundness" A more detailed method of measuring the minimum zone roundness is described in, for example, Non-Patent Literature (Yoshiyuki Omori, "An introduction to Roundness Measurement", Journal of the Japan Society of Precision Engineering, vol. 82, No. 9, 2016, pp. 803-806).

Referring to FIG. 11A, in the case where a distance (fourth distance E) from the outer peripheral end of cutting edge 3 of drill 100 to second exit end portion 52 is shorter than first distance A1 (see FIG. 4) when drill 100 is at the position of second state S2, second margin 20 does not reach second exit end portion 52. Therefore, drill 100 is not guided by second margin 20 at second exit end portion 52. As a result, drill 100 is moved to the lower right side of FIG. 11A. Thus, through hole 60 is expanded toward the lower right side, with the result that the roundness of the exit of through hole 60 is deteriorated. On the other hand in the case where the distance (fourth distance E) from the outer peripheral end of cutting edge 3 of drill 100 to second exit end portion 52 is longer than first distance A1, second margin 20 is brought into contact with second exit end portion 52. Therefore, drill 100 is guided by second margin 20 at second exit end portion 52. As a result, drill 100 can be suppressed from being moved to the lower right side of FIG. 11A. Thus, the roundness of the exit of the hole can be suppressed from being deteriorated.

It should be noted that workpiece 50 is a metal such as steel, for example. Workpiece 50 may be, for example, 38MnS6, which is an inexpensive microalloyed steel. Workpiece 50 may be a carbon steel, an alloy steel, a difficult-to-cut material, or a stainless material (SUS). A processing method may be, for example, MQL (Minimum Quantity Lubrication) processing.

Next, functions and effects of drill 100 according to the present embodiment will be described.

When the distance between the front end of first margin 10 and the front end of second margin 20 is short, only first margin 10 is brought into contact with the inner wall surface of the hole at the start of drilling; however, immediately thereafter, both first margin 10 and second margin 20 are brought into contact with the inner wall surface of the hole. Therefore, during the drilling, excessive torque is applied to the inner wall surface of the hole. As a result, the roundness of the hole is deteriorated. On the other hand, when the distance between the front end of first margin 10 and the front end of second margin 20 is long, only first margin 10 continues to be in contact with the inner wall surface of the hole for a while after the start of drilling. Thereafter, both first margin 10 and second margin 20 are brought into contact with the inner wall surface of the hole. Therefore, excessive torque can be suppressed from being applied to the inner wall surface of the hole during the drilling. As a result, the roundness of the hole is improved. Particularly, in the case of the MQL processing, the processing of a difficult-to-cut material, or the processing of SUS, the hole tends to be shrunk after the processing, with the result that the torque applied to the inner wall surface of the hole is likely to be excessive. Drill 100 according to the present embodiment particularly exhibits the effect in the case of the MQL processing, the processing of a difficult-to-cut material, or the processing of SUS.

Further, in the case where the distance between the front end of first margin 10 and the front end of second margin 20 is too long, drill 100 cannot be guided by second margin 20 when drill 100 is moved out of the oblique hole. Therefore, drill 100 interferes with the inner wall surface of the hole. As a result, the roundness of the hole cannot be improved.

According to drill 100 according to the embodiment, the distance between the front end of first margin 10 and the front end of second margin 20 in the direction parallel to axial line X is more than or equal to 3 mm and less than or equal to 5 mm. By setting the distance between the front end of first margin 10 and the front end of second margin 20 to be more than or equal to 3 mm, excessive torque can be suppressed from being applied to the inner surface of the hole. By setting the distance between the front end of first margin 10 and the front end of second margin 20 to be less than or equal to 5 mm, drill 100 can be suppressed from interfering with the inner wall surface of the hole when drill 100 is moved out of the oblique hole. As a result, the roundness of the hole formed in workpiece 50 can be improved.

As a method of attaining a long distance between the front end of first margin 10 and the front end of second margin 20, it is conceivable to employ a method in which thinning face 9 is made large and second margin 20 is formed such that the front end of second margin 20 is contiguous to thinning face 9. However, when thinning face 9 is made large, the web thickness of drill 100 becomes small. As a result, the rigidity of drill 100 is decreased.

According to drill 100 according to each of the above-described embodiments, second margin 20 is separated from each of flank face 8 and thinning face 9. Therefore, the distance between the front end of first margin 10 and the front end of second margin 20 can be made long without making thinning face 9 large. Thus, the roundness of the hole can be improved while maintaining the rigidity of drill 100 to be high.

According to drill 100 according to each of the above-described embodiments, the front end of second margin 20 may extend along the direction perpendicular to axial line X when viewed in the direction perpendicular to axial line X. When the front end of second margin 20 extends to be inclined with respect to the straight line perpendicular to axial line X, the width of second margin 20 in the rotation direction is smaller than that when the front end of second margin 20 extends along the straight line perpendicular to axial line X. Therefore, when the front end of second margin 20 extends to be inclined with respect to the straight line perpendicular to axial line X, the strength of second margin 20 becomes lower than that when the front end of second margin 20 extends along the straight line perpendicular to axial line X, with the result that second margin 20 is likely to be chipped. By extending the front end of second margin 20 along the direction perpendicular to axial line X when viewed in the direction perpendicular to axial line X, the strength of the front end of second margin 20 can be made high. As a result, the front end of second margin 20 can be suppressed from being chipped.

EXAMPLES (Preparation of Samples)

First, drills 100 of samples 1 and 2 were prepared drill 100 of sample 1 is a drill 100 according to a comparative example. Drill 100 of sample 2 is a drill 100 according, to an example of the present disclosure. In drill 100 of sample 1, second margin 20 was contiguous to flank face 8. In the direction parallel to axial line X, the distance between the front end of first margin 10 and the front end of second margin 20 was 1.5 mm. In drill 100 of sample 2, second margin 20 was separated from each of flank face 8 and thinning face 9. In the direction parallel to axial line X, the distance (first distance A1) between the front end of first margin 10 and the front end of second margin 20 was 4 mm.

(Evaluation Method)

Figure 12:
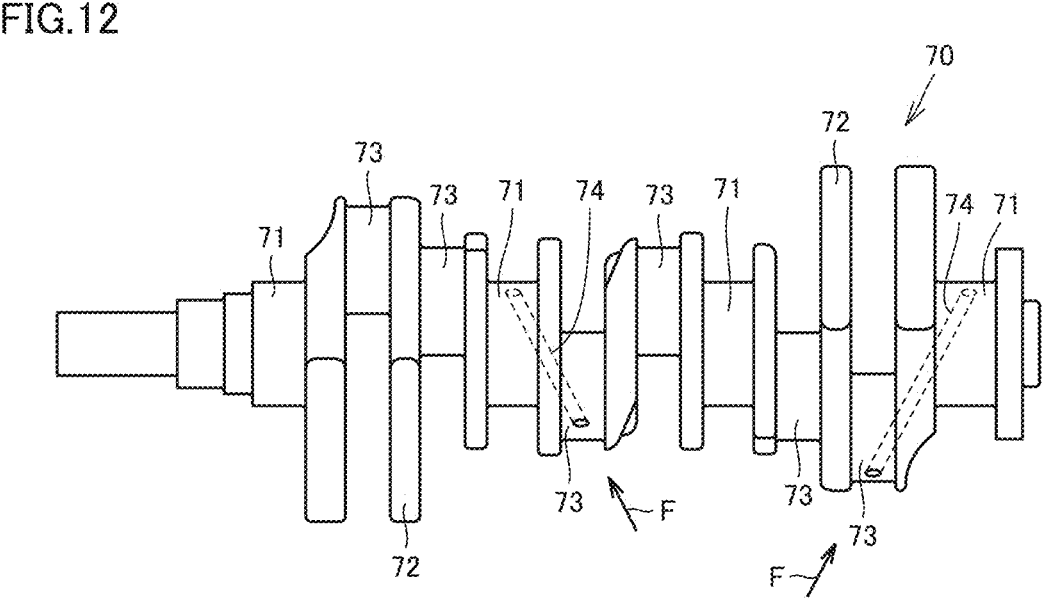
FIG. 12 is a schematic side view showing a configuration of a crankshaft.

Next, oil holes were formed in a crankshaft using each of drills 100 of samples 1 and 2. FIG. 12 is a schematic side view showing a configuration of the crankshaft. As shown in FIG. 12, a crankshaft 70 mainly includes crank journals 71, balance weights 72, and crank pins 73. As shown in FIG. 12, oil holes 74 were formed in crankshaft 70 (workpiece) using each of drills 100 of samples 1 and 2. Oil holes 74 are formed to extend from crank pins 73 to crank journals 71. The workpiece was 38MnS6. The diameter of drill 100 was 4.95 mm. The diameter of each of the holes was 4.8 (+0.3/−0.1) mm. The depth of the hole was 100.2 mm. A cutting speed (peripheral speed) was 80 m/min. A feed speed f was 0.15 mm/rev. As equipment, DH524 provided by NACHI-FUJIKOSHI CORP was used. The load current value of the main spindle of the processing equipment was measured while forming oil hole 74 in crankshaft 70 using each of drills 100 of samples 1 and 2. Further, the roundness of the oil hole formed in crankshaft 70 was measured.

(Evaluation Results)

Figure 13:
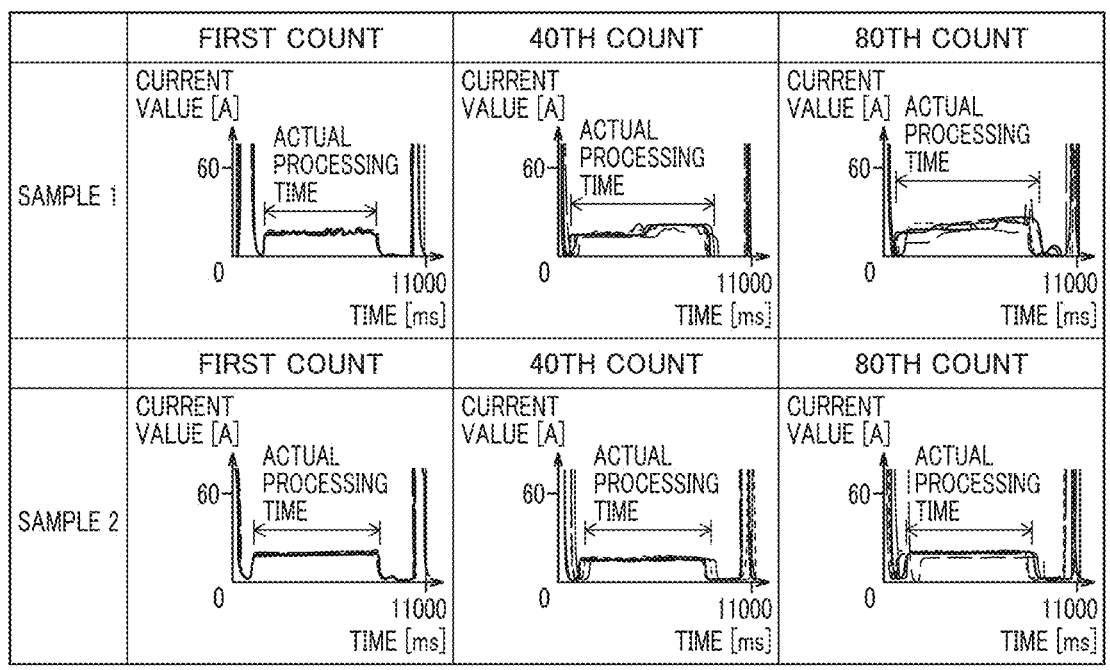
FIG. 13 is a diagram showing a relation between a current value and time.

FIG. 13 is a diagram showing a relation between a current value and time. In FIG. 13, the horizontal axis represents time (unit: millisecond). In FIG. 13, the vertical axis represents a load current value (unit: amp) of the main spindle of the processing equipment. In FIG. 13, pieces of data of five different types of lines are shown. The different types of lines represent respective pieces of data of different drills. In FIG. 13, five drills (N=5) were used for each of the drills of samples 1 and 2. The first count corresponds to data in the first round of drilling. The 40th count corresponds to data in the 40th round of drilling. The 80th count corresponds to data in the 80th round of drilling.

As indicated in variation in current value in an actual processing time of FIG. 13, at the first count, the current value of the drill of sample 2 was more stable than the current value of the drill of sample 1. Further, as the number of the rounds of processing is increased to the 40th count and the 80th count, the variation in current value of the drill of sample 1 during the actual processing time becomes large and unstable. On the other hand, the variation in current value of the drill of sample 2 during the actual processing time was small and stable even when the number of the rounds of processing was increased to the 40th count and the 80th count. As shown in FIG. 13, at the 40th count, the current value of the drill of sample 2 was more stable than the current value of the drill of sample 1. Similarly, at the 80th count, the current value of the drill of sample 2 was more stable than the current value of the drill of sample 1.

TABLE 1

| Position of Hole | Sample 1 | Sample 2 |
|---|---|---|
| First Area | 26.1 μm | 9.6 μm |
| Second Area | 31.7 μm | 14.5 μm |

Table 1 shows the roundness of the hole (oil hole 74). The roundness of the hole was measured using a roundness measuring instrument (model number: Crysta-Apex C9166) provided by Mitsutoyo. For the measurement, a stylus (model number: MS2-3R27.5 provided by Mitsutoyo) was used which had a shaft composed of cemented carbide with an effective length of 27.5 mm and had a ruby ball having a diameter of 3 mm at its tip. For each of first and second areas, the roundness of the hole was measured as follows. First, in a cross section that intersects plane H separated by a distance of 5 mm from second exit end portion 52, an intersection line K was defined to represent an intersection line between workpiece 50 and through hole 60. Next, in plane H, the positions of four points disposed on intersection line K at equal angles with respect to axial line X were measured. The roundness of the hole was found from these four positions as described above. The first area is oil hole 74 shown on the left side of FIG. 12 (oil hole 74 extending from crank pin 73 located the third from the left to crank journal 71 located the second from the left). The second area is oil hole 74 shown on the right side of FIG. 12 (oil hole 74 extending from crank pin 73 located the sixth from the left to crank journal 71 located the fourth from the left). As shown in Table 1, the roundness of the oil hole formed in the first area using drill 100 of sample 1 was 26.1 μm. The roundness of the oil hole formed in the second area using drill 100 of sample 1 was 31.7 μm. On the other hand, the roundness of the oil hole formed in the first area using drill 100 of sample 2 was 9.6 μm. The roundness of the oil hole formed in the second area using drill 100 of sample 2 was 14.5 μm. In view of the above results, it was proved that the roundness of the ad hole formed by drill 100 of the example of the present disclosure was significantly improved as compared with the roundness of the oil hole formed by drill 100 of the comparative example.

The embodiments and examples disclosed herein are illustrative and non-restrictive in any respect. The scope of the present invention is defined by the terms at the claims, rather than the embodiments described above, and is intended to include any modifications within the scope and meaning equivalent to the terms of the claims.

REFERENCE SIGNS LIST

1: front end; 2: rear end; 3: cutting edge; 5: swarf discharging surface; 6: outer peripheral surface; 7: shank; 8: flank face; 9: thinning face; 10: first margin; 11: first outer peripheral portion; 12: first side surface portion; 13: first front end; 20: second margin; 21: second outer peripheral portion; 22: second side surface portion; 23: second front end; 24: third side surface portion; 30: coolant hole; 31: outer peripheral region; 41: first region; 42: second region; 50: workpiece; 51: first exit end portion; 52: second exit end portion; 53: exit end surface; 60: through hole; 70: crankshaft; 71: crank journal; 72: balance weight; 73: crank pin; 74: oil hole; 100: drill; 101: first direction; 102: second direction; A1: first distance; A2: second distance; A3: third distance; B1: first length; B2: second length; C1: first width; C2: second width; D: diameter; E: fourth distance; G: fifth distance; F: moving direction; L: length; P1: first position; P2: second position; P3: third position; P4: fourth position; S1: first state; S2: second state; X: axial line.

The invention claimed is:

1. A drill rotatable about an axial line, the drill comprising:
   a flank face;
   a thinning face contiguous to the flank face;
   an outer peripheral surface contiguous to each of the flank face and the thinning face; and
   a swarf discharging surface contiguous to each of the flank face and the outer peripheral surface, wherein
   a ridgeline between the flank face and the swarf discharging surface forms a cutting edge,
   the outer peripheral surface is provided with an outer peripheral region, a first margin contiguous to each of the cutting edge and the flank face, and a second margin that is located on a rear side with respect to the first margin in a rotation direction of the drill and that is separated from an entirety of each of the flank face and the thinning face by the outer peripheral region of the outer peripheral surface,
   an outer peripheral portion of the first margin has a back taper with a same angle as a back taper of an outer peripheral portion of the second margin,
   in a direction parallel to the axial line, a first distance between a front end of the first margin and a front end of the second margin is more than or equal to 3 mm and less than or equal to 5 mm, and
   the outer peripheral region is a surface area that extends so as to contact each of the front end of the second margin, a first side surface portion of the first margin, an edge of the thinning face, and an edge of the flank face.

2. The drill according to claim 1, wherein when the drill is viewed in a direction perpendicular to the axial line, the front end of the second margin extends along the direction perpendicular to the axial line.

3. The drill according to claim 2, wherein in the direction parallel to the axial line, a length of the swarf discharging surface is 10 times or more and 55 times or less as large as a diameter of the drill.

4. The drill according to claim 3, wherein the second margin is separated from the swarf discharging surface.

5. The drill according to claim 2, wherein the second margin is separated from the swarf discharging surface.

6. The drill according to claim 1, wherein in the direction parallel to the axial line, a length of the swarf discharging surface is 10 times or more and 55 times or less as large as a diameter of the drill.

7. The drill according to claim 6, wherein the second margin is separated from the swarf discharging surface.

8. The drill according to claim 1, wherein the second margin is separated from the swarf discharging surface.

9. The drill according to claim 1, wherein
   a second distance is defined from the front end of the second margin to a rear end of the second margin in the direction parallel to the axial line,
   the second distance is longer than the first distance,
   a third distance represents a distance between a front end of the drill and the front end of the first margin in the direction parallel to the axial line, and
   the third distance is shorter than the first distance.

10. The drill according to claim 1, wherein a width of the second margin is larger than a width of the first margin in the rotation direction.

11. The drill according to claim 1, wherein a second distance is defined from the front end of the second margin to a rear end of the second margin in the direction parallel to the axial line, and
    the second distance is longer than the first distance.

* * * * *